United States Patent [19]

de Putter

[11] 4,022,249

[45] May 10, 1977

[54] FIBROUS TUBE FOR MEMBRANE FILTRATION WITH A TEARING MEMBER

[75] Inventor: Warner Jan de Putter, Hardenberg, Netherlands

[73] Assignee: Wafilin B.V., Zwolle, Netherlands

[22] Filed: June 30, 1975

[21] Appl. No.: 591,702

[30] Foreign Application Priority Data

July 3, 1974 Netherlands ...................... 7409029
Sept. 30, 1974 Netherlands ...................... 7412910

[52] U.S. Cl. .............................. 138/178; 138/103; 138/140; 138/177; 210/342; 210/484
[51] Int. Cl.² ..................... F16L 11/12; F16L 11/02
[58] Field of Search .......... 138/103, 137, 140, 141, 138/177, 178; 229/51 AS, 51 TS, 4.5; 210/321, 342, 232, 463, 484

[56] References Cited

UNITED STATES PATENTS

| | | | |
|---|---|---|---|
| 2,677,165 | 5/1954 | Copenhaver et al. | 138/144 X |
| 2,968,124 | 1/1961 | Coplen | 229/4.5 X |
| 3,312,250 | 4/1967 | Sirignano et al. | 138/154 X |
| 3,457,170 | 7/1969 | Havens | 210/23 |
| 3,601,159 | 8/1971 | Marks et al. | 138/141 |
| 3,642,564 | 2/1972 | Walker et al. | 229/51 AS X |

*Primary Examiner*—Richard E. Aegerter
*Assistant Examiner*—James E. Bryant, III
*Attorney, Agent, or Firm*—Wigman & Cohen

[57] ABSTRACT

An assembly comprising a non-woven tube having fixed on its inner side a membrane for membrane filtration, and a tearing element provided in the non-woven tube. The tearing element consists preferably of a longitudinal welding joint obtained by ultrasonic welding.

8 Claims, 7 Drawing Figures

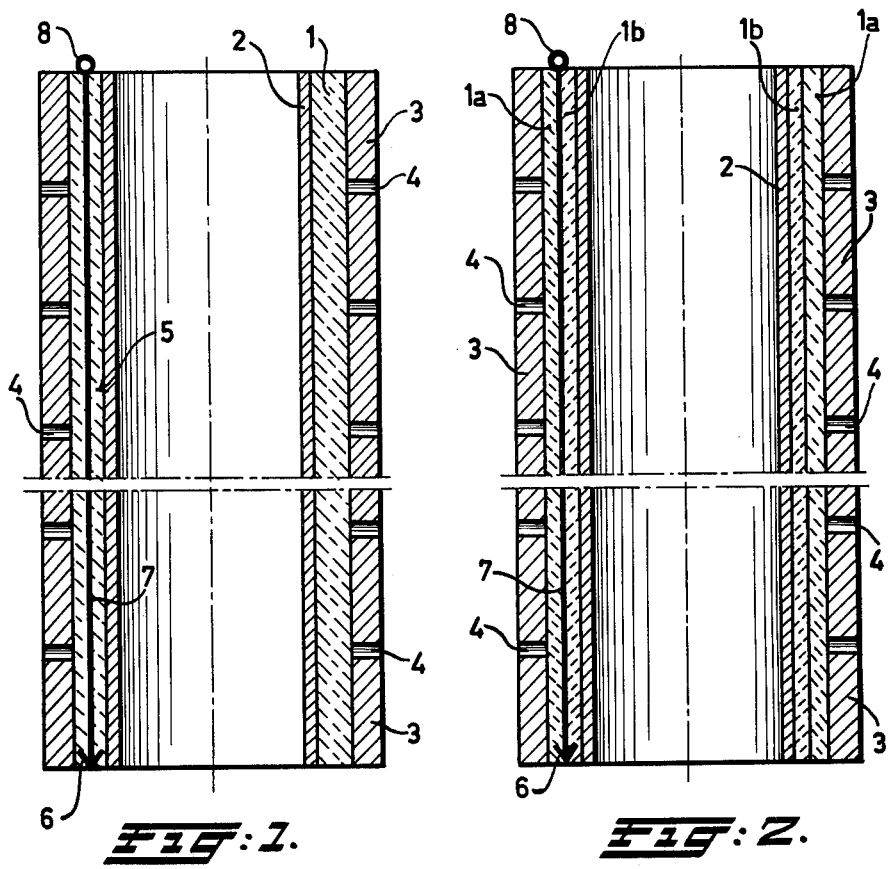
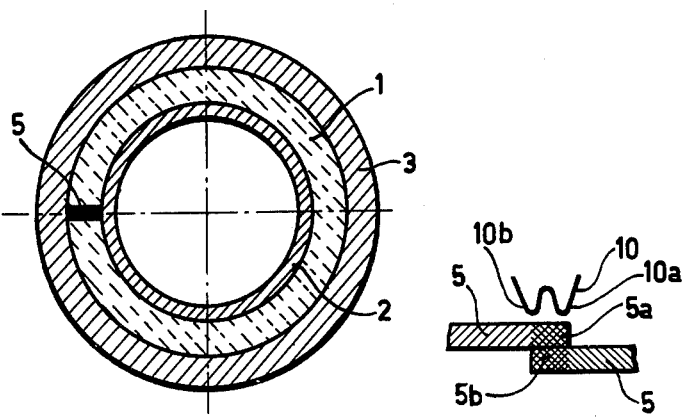

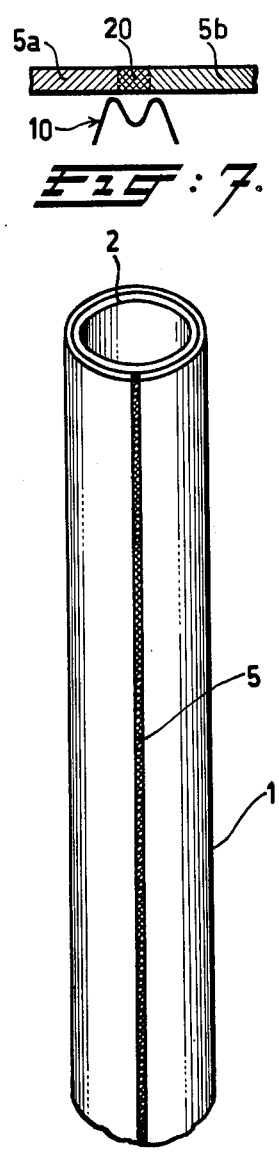
FIG. 4.
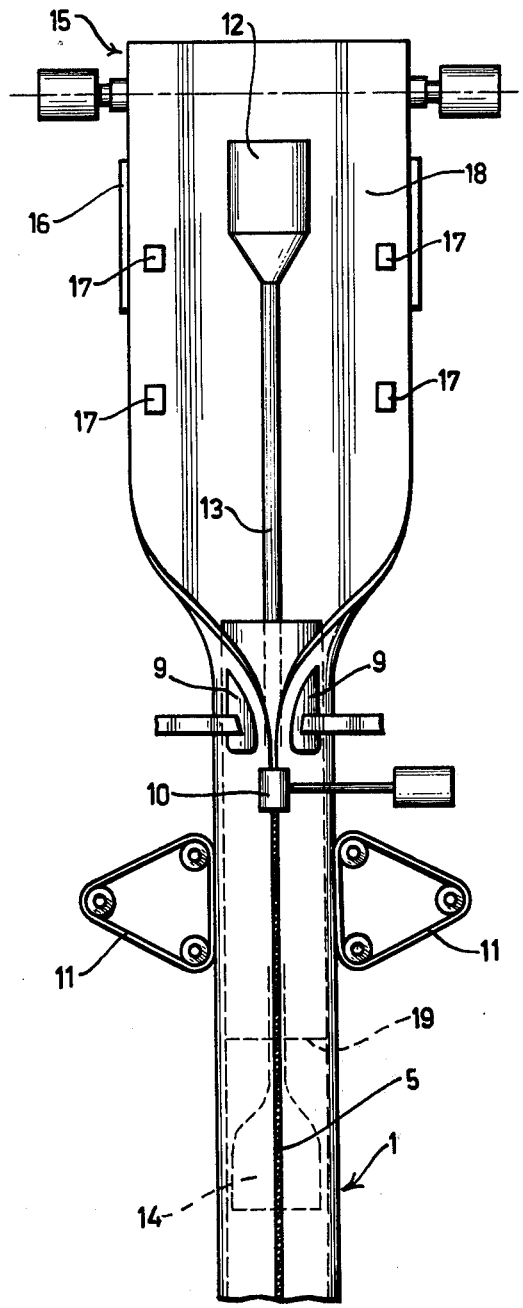
FIG. 7.
FIG. 5.

FIBROUS TUBE FOR MEMBRANE FILTRATION WITH A TEARING MEMBER

BACKGROUND OF THE INVENTION

The present invention relates to a thin-walled tube, of a porous non-woven material, a membrane being attached to its inside for membrane filtration and in particular for reversed osmosis.

Such a tube of a non-woven material, for example of paper or polyester fibres with a membrane attached on its inside for reverse osmosis, is known per se. Fibrous tubes with a membrane are placed in supporting tubes after a suitable pre-treatment; these latter tubes are for instance made of a synthetic material with apertures. Thereafter, a liquid to be purified flows under high pressure through the inside of the fibrous tubes with membrane. Owing to this high pressure, liquid passes the membrane and arrives in the non-woven layer from which it is discharged via apertures in the supporting tube. It is, however, impossible for the dissolved agents in the liquid to be purified to pass the membrane, even under the influence of high pressure; these agents are discharged therefore together with the liquid as a more concentrated impure solution.

A disadvantage of such a fibrous tube with a membrane is that it is generally very difficult to remove the tube and membrane from the supporting tube when the membrane is worn out. According to the high inner pressure, the non-woven material of the tube is usually pressed against the inside of the supporting tube.

A consequence of the above is that in practice one is generally forced to use vigorous means for removing the non-woven material, which generally results in the apparatus being inoperative for a longer time than is justified in view of its extensive investment cost.

It has been attempted to facilitate the removal of the fibrous tube from the supporting tube by mechanical means, which operation has not heretofore proved satisfactory.

SUMMARY AND OBJECTS OF THE INVENTION

An object of the present invention is to provide a longitudinal thin-walled tube of a porous non-woven material with a membrane for membrane filtration attached to its inside such, that the porous non-woven material can be easily removed from a supporting tube, after the membrane is worn out.

This is achieved in that the fibrous tube is provided with a tearing member by means of which the fibrous tube can be easily removed from the supporting tube, as at least part of the fibrous tube will be torn in a longitudinal direction.

Said tearing member, in one embodiment of the invention, efficiently consists of a drawing element, mounted in the upper side of the fibrous tube and a hook-shaped element mounted in the lower side of the fibrous tube. When using such a tearing member, after the membrane is worn out, the hook-shaped element can be drawn upwardly to tear the fibrous tube, by pulling the drawing element.

A very efficient embodiment is to mount the tearing element between two consecutive layers of non-woven material of the fibrous tube, which mounting presents the advantage that the parts of the tearing element will not interfere with the operation of any of the membranes, as this tearing element is more or less embedded in the non-woven material. Moreover only the outer part of the fibrous tube can be torn in this way, the removal being thus more effective than when the tube is torn completely.

In another embodiment of the invention, the tearing member is advantageously composed of a strip of welded fibres of the fibrous tube and in particular of a longitudinal joint, produced by an ultrasonic welding operation.

Joints obtained by means of ultrasonic welding are very reliable, as the layers to be welded by such means, are heated homogenously, which is not usually possible in a normal welding operation. Ultrasonic welding moreover, provides a very small joint, while having substantially no effect on the porosity of the tube, whereas a membrane for membrane filtration, mounted within the tube is seldom damaged by any occurring tears, even when the inner pressure is rather high.

The sides can overlap each other in an ultrasonic welding process and the desired longitudinal welding joint can be acquired by buttwelding the adjoining sides.

Another advantage of this process is, that one can easily utilise a mandril in order to shape a tube with a non-circular diameter, e.g. a triangular diameter. Tubes with such a diameter lend themselves admirably to some embodiments of fibrous tubes.

The invention in another aspect aims to provide a process for manufacturing such a tube in a very simple manner, notwithstanding the disadvantages as described hereinbefore. Thus it is possible to manufacture very great quantities of a fibrous tube per time unit.

This is achieved by continuously folding the sides of a non-woven band towards each other and by welding them in an ultrasonic manner while forming a fibrous tube with a longitudinal welding joint.

The invention also relates to apparatus for performing this process comprising a member for supplying a non-woven band, a mandril, a conveying member for having at least part of a side zone of a non-woven band contact another part of a side zone, and a welding member for welding any adjoining or consecutive zone parts. This apparatus is provided with a member for ultrasonic welding situated in or above the mandrel and with conveying members, which are able to shape a tube from the non-woven band, on the mandrel.

BRIEF DESCRIPTION OF THE DRAWINGS

FIG. 1 schematically shows a fibrous tube in section together with a supporting member in a supporting tube;

FIG. 2 shows another embodiment of such a tube in section;

FIG. 3 shows still another embodiment with a longitudinal strip of welded fibres;

FIG. 4 shows still another embodiment of the tube according to the invention;

FIG. 5 shows an apparatus for manufacturing such a tube;

FIG. 6 shows a detail for establishing a longitudinal welding joint of the fibrous tube;

FIG. 7 shows a detail for establishing a longitudinal welding joint with an intermediate strip.

DETAILED DESCRIPTION OF A PREFERRED EMBODIMENT

FIG. 1 shows a non-woven tube 1 of polyester fibres having fixed on its inner side a cellulose acetate membrane 2. The assembly is accommodated in a supporting tube 3 of thermoplastic material with openings 4 for discharging the permeate which has passed through the membrane 2.

After the membrane is worn out, the non-woven material of fibrous tube 1 is pressed against the surface of the supporting tube, owing to the inner pressure, produced by the reverse osmosis process. Consequently the fibrous tube 1 cannot be removed from the supporting tube 3 without substantial difficulty.

To alleviate this disadvantage, a tearing member 5 is provided in tube 1, this tearing member comprising a hook-shaped element 6 for tearing the fibrous tube, the hook-shaped element being connected, through a thread 7, with a strain ring 8, which can for instance be furnished with a drawing hook (not shown).

FIG. 2 shows another embodiment of such a fibrous tube 1, consisting of two non-woven layers 1a and 1b, e.g. of polyester fibrous paper, the tearing element 5 being embedded between the two layers 1a and 1b. In some cases the assembly can be easily removed.

FIG. 3 shows still another embodiment in which tearing element 5 is formed by a strip of welded polyester fibres of the fibrous tube 1.

This tearing element 5 can be efficiently made in one or both layers 1a and 1b of the fibrous tube of FIG. 2 as well.

FIG. 4 shows a fibrous polyester non-woven tube 1 with a longitudinal joint 5 obtained by means of ultrasonic welding. This joint may serve as a tearing member. Tube 1 is, on its inner side, provided with a cellulose-acetate membrane 2 for reverse osmosis.

In FIG. 5 an apparatus is shown for effecting such a welding joint by means of ultrasonic welding, which apparatus comprises a reel 15 for supplying web 18, to be conveyed to a stationary mandril 19 via a supply support 16. On conveying web 18 over support 16, the web is retained by clamping nipples 17. Thereafter the web is conveyed over mandril 19, for which purpose some conveying elements 9 clamp the web against the hollow circular mandril 19.

An ultrasonic welding member 10 for establishing the longitudinal welding joint 5 is mounted over mandril 19, for obtaining the desired fibrous tube 1 with a tearing member.

For conveying fibrous tube 1, conveying members, i.e. rubber strips 11, are used.

The apparatus is furthermore provided with a container 12, comprising a discharge pipe 13, flowing into the fibrous tube, for supplying the liquid membrane composition for the membrane to be formed. In order to obtain the correct thickness of the membrane of the tube a torpedo-shaped body 14 is held in the inner side.

FIG. 6 shows a detail of the formation of a longitudinal welding joint in the situation when edge zones 5a and 5b of a non-woven band 5 overlap each other. In this situation a welding horn 10 for ultrasonic welding is utilised. Mandril parts 10a and 10b provide the correct pressure during the ultrasonic welding process.

Instead of overlapping edge zones 5a and 5b, the edges of these zones can also be welded together by adjoining these zones in a nonoverlapping way.

FIG. 7 shows an advantageous embodiment in which a band or strip 20 of a weldable material is used for connecting edge zones 5a and 5b. This strip may consist of a polyester material, for instance a polyester non-woven.

What I claim is:

1. A tubular assembly for membrane filtration apparatus comprising a thin-walled tube constructed of a fibrous, porous material, a filtration membrane disposed on the interior wall of said tube and means disposed in the wall of said tube for tearing said wall whereby removal of said tubular assembly from the membrane filtration apparatus is facilitated.

2. A tubular assembly according to claim 1, wherein said fibrous tube has two ends, said tearing means comprising a tearing member extending longitudinally in said tube between the ends thereof, a drawing element connected to said tearing member at one end of said tube and a hook-shaped element connected to said tearing member at the other end of said tube.

3. A tubular assembly according to claim 2, wherein said fibrous tube comprises at least two layers of non-woven material, said tearing element being embedded between said two layers of non-woven material.

4. A tubular assembly according to claim 1, wherein the fibers of said fibrous tube are weldable and wherein said tearing means comprises a tearing element formed at least partly by a strip of welded fibers of said fibrous tube.

5. A tubular assembly according to claim 4, wherein said strip of welded fibers extends longitudinally of said tube and is formed by ultrasonic welding.

6. A tubular assembly according to claim 4, wherein said fibrous tube is formed of a band of non-woven material, said band having edge zones formed into overlapping relation, said tearing element comprising a weld joint at the overlapped edge zones.

7. A tubular assembly according to claim 6, wherein said fibrous tube is formed of a band of non-woven material, said band having edge zones formed into abutting relation, said tearing element comprising a weld joint at the abutting edge zones.

8. A tubular assembly according to claim 4, wherein said fibrous tube is formed of a band of non-woven material, said band having edge zones formed into spaced, confronting relation and including a weldable strip disposed between the confronting end zones, said tearing element comprising a welded joint between said end zones and said weldable strip.

* * * * *